United States Patent
Staub et al.

(12) 
(10) Patent No.: US 6,365,907 B1
(45) Date of Patent: Apr. 2, 2002

(54) DEVICE FOR RECOGNIZING DIFFRACTION OPTICAL MARKINGS

(75) Inventors: René Staub, Cham; Wayne Robert Tompkin, Baden, both of (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 09/445,319

(22) PCT Filed: Jun. 3, 1998

(86) PCT No.: PCT/EP98/03302

§ 371 Date: Mar. 22, 2000

§ 102(e) Date: Mar. 22, 2000

(87) PCT Pub. No.: WO98/55963

PCT Pub. Date: Dec. 10, 1998

(30) Foreign Application Priority Data

Jun. 6, 1997 (CH) ................................................ 1367/97

(51) Int. Cl.[7] ................................................ G06K 7/10
(52) U.S. Cl. ........................................ 250/566; 356/71
(58) Field of Search ................................ 250/566, 569, 250/570; 235/462.01; 356/71

(56) References Cited

U.S. PATENT DOCUMENTS

| | | |
|---|---|---|
| 4,544,266 A | 10/1985 | Antes |
| 5,291,006 A | 3/1994 | Nishiguma et al. |
| 5,461,239 A | 10/1995 | Atherton |
| 5,497,227 A | 3/1996 | Takeuchi et al. |
| 5,754,520 A | 5/1998 | Tompkin et al. |

FOREIGN PATENT DOCUMENTS

| | | |
|---|---|---|
| EP | 0 075 674 A2 | 4/1983 |
| EP | 0 412 316 A2 | 2/1991 |
| EP | 0 538 813 A2 | 4/1993 |
| EP | 0 568 186 A2 | 11/1993 |
| GB | 2 128 549 A | 5/1984 |

*Primary Examiner*—Stephone B. Allen
(74) *Attorney, Agent, or Firm*—Proskauer Rose LLP

(57) ABSTRACT

The invention relates to a device for the simultaneous machine recognition of Q diffraction optical markings (11) of a security element (4), which devices comprises a light source (1) for projecting parallel light (10) onto a document (3) provided with said security element (4), an optical collector element (2), photodetectors (5; 6) for converting the light (15; 16) diffracted on the markings (11) or the rays reflected on the substrate (3) into electrical signals, as well as an evaluation unit for evaluating said signals. The photodetectors (5; 6) are positioned in the focal plane (8') of the optical collector element (2). In each case two photodetectors (5; 6) form a photodetector pair. The electrical signals of each pair are analysed and the results of all photodetector pairs are compared with corresponding reference values in the evaluation unit. All the optical markings (11) are read simultaneously and form a code for identifying the security element (4).

18 Claims, 3 Drawing Sheets

DEVICE FOR RECOGNIZING DIFFRACTION OPTICAL MARKINGS

The invention relates to an apparatus for the machine recognition of optical-diffraction markings of the kind set forth in the classifying portion of claims 1 and 4.

Such apparatuses for the machine recognition of optical-diffraction markings are suitable for checking the authenticity of documents, postage stamps, bank notes, identity papers, passes and the like, having a security feature which contains corresponding optical-diffraction markings.

German laid-open application (DE-OS) No 23 52 366 illustrates the basic arrangement of a reading device for a transparent security structure utilising Fourier transformation by a suitable optical arrangement having a lens. Parallel light which is incident in perpendicular relationship on a macroscopic security structure formed with prisms is deflected by refraction. Identical prisms involving the same azimuthal orientation deflect the light in the form of parallel beams and are focused by the optical arrangement onto a point in the focal plane of the optical arrangement. The distribution of the levels of light intensity in the focal plane forms the recognition feature.

The reading device known from German laid-open application (DE-OS) No 25 38 875 utilises Fourier transformation to recognise a predetermined relief structure of a uniform diffraction grating, by light irradiation. The reading device compares the levels of intensity of the light beams which are deflected in diffraction orders of different magnitudes, and it is thus possible to infer the cross-sectional shape of the relief used in the diffraction grating. An increase in the degree of security in relation to authenticity recognition is achieved by sequential reading of successive diffraction gratings or by means of a plurality of reading devices which investigate diffraction gratings disposed on the substrate at various predetermined locations in parallel relationship.

Swiss patent specification No 653 160 describes a development of the reading device shown in DE-OS No 25 38 875 for an authenticity feature which includes a plurality of simultaneously illuminated portions with different diffraction structures as encoding means. The light which is diffracted at the diffraction structures is focused by an optical means in the focal plane thereof. In the focal plane the locations of high light intensity are determined only by the parameters such as spatial frequency, azimuth etc of the various diffraction structures. If those locations coincide with those of light receivers arranged in a predetermined fashion, the authenticity feature is recognised as such.

U.S. Pat. Nos. 4,034,211 and 4,023,010 describe a further reading device for sequential optical scanning of a data track comprising successive equal-sized diffraction gratings with a thin light beam which illuminates only a portion of the diffraction grating. These publications refer to the errors which are possible in a practical context when effecting optical scanning such as for example tilting of the plane of the diffraction grating relative to the reading plane and a larger or smaller spacing of the plane of the diffraction grating relative to the reading plane. The known optical arrangement for Fourier transformation eliminates the effects of spacing errors.

EP-0 718 834 A2 describes an optical data carrier with a high recording density (bits/cm$^2$) and a reading device for securely reading the sequential series on the data carrier of information patterns which are composed of a plurality of diffraction gratings.

The reading device known from EP 0 533 448 A2 has symmetrical large-area photodetectors which are arranged around the reading beam and whose light-sensitive surfaces cover the sectors of a circular ring or two concentric circular rings. The reading device recognises sequential series, contained on a data carrier, of information patterns which are composed of a plurality of diffraction gratings.

All those reading devices require precise guidance of the data carrier while precisely maintaining the spacing and accurate orientation of the diffraction patterns on the data carrier, in order in any way to permit the diffraction pattern to be read off. In the case of the previously known reading devices, it is not possible to exclude the reading device being easily deceived by means of suitably arranged mirror or prism surfaces.

The reading device in accordance with Swiss patent specification 653 162 excludes such a deception effect insofar as the change in the diffraction angle is detected upon a periodic change in the wavelength of the light for irradiating the diffraction grating.

A security feature which can be copied only with a very great amount of difficulty and the production thereof from surface elements with reflecting diffraction gratings are described in EP-105 099, EP-169 326 and U.S. Pat. No. 5,032,003. The diffraction gratings reflect incident white light, divided up into colours, into the various diffraction orders, at given azimuth angles, wherein the grating parameters of the diffraction gratings such as profile shape, spatial frequency and azimuth direction are crucial in terms of the diffraction characteristics. The use of asymmetrical profile shapes for the inconspicuous incorporation of machine-readable information in the pattern of such security elements is taught by EP-360 969 A1 and EP-366 858 A1 which also show diagrammatic embodiments of reading devices which can recognise asymmetry of the profile shapes.

The object of the present invention is to provide an inexpensive, simple, optical reading device for a data carrier with an optically diffractive security feature, whose optical features can be read out by machine simultaneously and without high demands in terms of the orientation of the data carrier.

In accordance with the invention that object is attained by the features of claims 1 and 4. Advantageous configurations are set forth in the appendant claims.

Embodiments of the invention are described in greater detail hereinafter with reference to the drawings in which.

Figure 1:
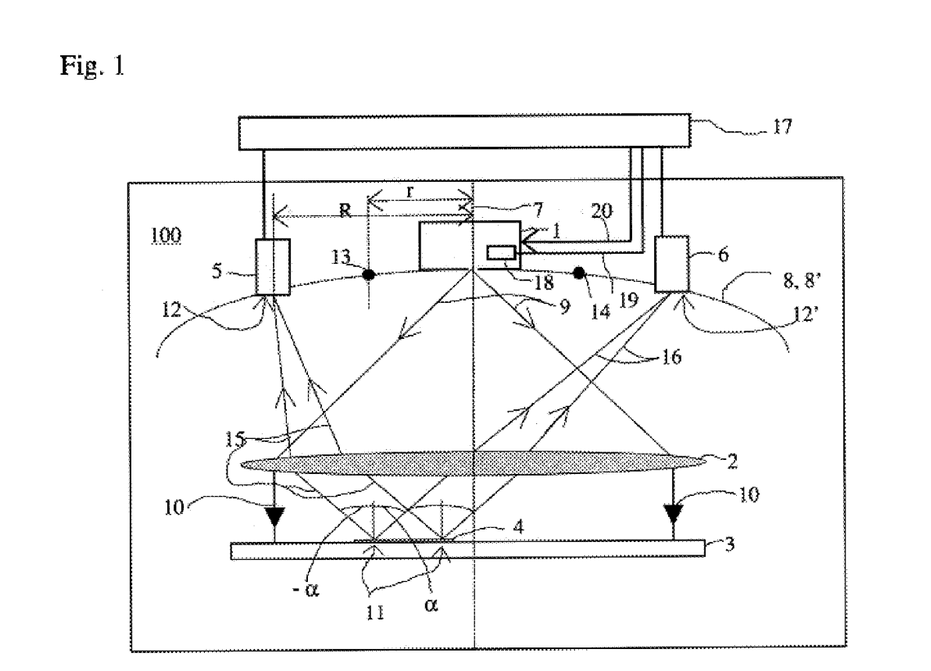
FIG. 1 is a view in cross-section of a reading device.

Referring to FIG. 1, reference 1 denotes a light source, reference 2 an optical convergent element, reference 3 a document, reference 4 a security element, references 5 and 6 a photodetector which in the drawing of FIG. 1 is shown to the left and to the right respectively of the optical axis 7 of the convergent element 2, and reference 8 denotes the line of intersection of the one focal surface 8', which is towards the light source 1, of the convergent element 2, with a notional diffraction plane 100 which is illustrated only for the purposes of improved description and which is established by the optical axis 7 and a pair of photodetectors formed from the photodetectors 5 and 6. The two photodetectors 5 and 6 are disposed symmetrically with respect to the optical axis 7 and are therefore at the same spacing R relative to the optical axis 7. Lenses, concave mirrors, holograms, diffraction gratings and the like can be used as the convergent element 2. As a result of aberrations of the convergent element 2, the focal surface 8' is not a plane but a curved surface which has a curved intersection line 8 in common with the diffraction plane 100.

In the light source 1 for example a laser, a laser diode, a light emitting diode (LED) or an incandescent lamp with a colour filter produces almost monochromatic radiation of a predetermined wavelength λ from the infrared and/or visible spectrum. An exit optical system (not shown here) of the light source 1 focuses the radiation of the light source 1 onto the focal surface of the convergent element 2 so that the radiation is fanned out to form a beam cone 9, the tip of which is on the intersection line 8 and which illuminates over a large area the effective aperture of the convergent element 2. From the radiation which is incident in a conical configuration, the convergent element 2 produces a parallel beam of rays 10 which is defined by the effective aperture of the convergent element 2. The beam 10 is parallel to the extended axis of the beam cone 9 and statically illuminates a part of the document 3 and the security element 4 disposed thereon. A large aperture is advantageously selected for the convergent element 2 as the diameter of the beam of rays 10 depends thereon and thus lesser requirements are made in terms of the orientation of the security element 4 or the document 3 respectively in the beam 10. The axis of the beam cone 9 does not have to coincide with the optical axis 7, as is shown here in the drawing of FIG. 1 for the sake of simplicity.

The security element 4 is typically a laminate, which is secured by adhesive on the document 3, consisting of plastic materials with a plurality of embedded surface elements with reflective diffraction structures of which some or all serve as markings 11 having an optical-diffraction effect, with information which can be recognised by the reading device. The surface elements form one of the patterns which are known from the publications referred to in the opening part of this specification and which are also visually visible through a transparent cover layer of the laminate. A possible configuration of such a laminate is known from EP-401 466. A configuration of the optical markings 11 is described in parallel Swiss application No 1 368-97.

The parallel beam 10 impinges in perpendicular relationship on the two surface portions identified by an arrow, with first markings 11 which have an optical diffraction effect. They involve the same grating parameters (azimuth φ, profile shape, spatial frequency and so forth), the direction of the azimuth φ being parallel to the diffraction plane 100. The surface portions are distributed at various locations on the surface of the security element 4 and integrated into the pattern thereof. The total surface with the marking 11 is preferably divided into a plurality of surface portions so that the marking 11 is not sensitive to damage to the cover layer. The first markings 11 diffract for example for the diffraction orders m=±1 the incident light of the wavelength λ at the diffraction angle ±α symmetrically with respect to the incident beam 10. Parallel light diffracted at the diffraction angle ±α in the diffraction plane 10 is passed from each surface portion with the marking 11 to the convergent element 2. As is known, parallel light beams, after passing through the convergent element 2, are focused on the focal surface 8' to a single point 13 and 14 respectively whose spacing r from the optical axis 7 is determined by the angle between the parallel light beams and the optical axis 7. The convergent element 2 therefore produces a punctiform primary image of the overall surface from the light 15 diffracted at the diffraction angle −α on the intersection line 8 where there is arranged a surface 12 of the photodetector 5, which is operative for the conversion of light into electrical current. The light 16 which is diffracted at the diffraction angle +α is correspondingly focused onto an operative surface 12' of the photodetector 6.

If the further markings 11 involve another spatial frequency, then with the same illumination diffraction occurs at another diffraction angle, the value of which differs from the value α so that the diffracted light is focused for example to the points 13 and 14 which are disposed symmetrically with respect to the optical axis 7. The spacing r relative to the optical axis 7 is different from the spacing R. If in contrast the direction of the azimuth φ of another optical marking 11 faces out of the plane 100, the two focal points for the diffracted radiation thereof are admittedly on the focal surface 8', but turned through the azimuth φ out of the diffraction plane 100.

The light which is diffracted at all surface elements of the security element 4 which have an optical-diffraction effect, including the markings 11, will produce the primary image irrespective of the location of the surface portions in the beam 10 corresponding to the wavelength λ of the illumination, the diffraction angle and the grating parameters in the focal plane 8' of the convergent element 2, the two focal points of the same diffraction order involving the polar co-ordinates r, φ, and r, φ+180°.

The origin of the co-ordinates system is the point of intersection of the optical axis 7 or the light of the zero diffraction order with the focal plane 8'. The operative surfaces 12, 12' of the two photodetectors 5, 6 determine the solid angle of acceptance for the diffracted light 15, 16. The centres of the acceptance surfaces involve the polar co-ordinates R, φ and R, φ+180° and accordingly can only receive the radiation which is convergent in the acceptance surfaces and which is diffracted at the surface portions of the first marking 11, but not diffracted light from the other optical markings.

The photodetectors 5 and 6 convert the diffracted light 15 and 16 respectively which is incident on their operative surfaces 12 and 12' into an electrical signal which is proportional to the intensity of the diffracted light 15 and 16. The signal S1 from the photodetector 5 and the signal S2 from the photodetector 6 is respectively passed by way of a line to an evaluation unit 17. The evaluation unit 17 forms from the two electrical signals S1 and S2 at least the relative difference RD=(S1−S2):(S1+S2).

If the signal RD is different from zero, the markings 11 are of an asymmetrical grating profile, the function sign (RD) denoting the direction of the azimuth φ in the plane 100.

The evaluation unit 17 advantageously controls the level of intensity of the light source 1 so that the photodetectors 5, 6 and the light source 1 operate in the optimum range. A photoelectric cell 18 monitors the level of intensity of the light source 1, measuring a fixed proportion of the light flux generated in the light source 1. The output signal AS of the photoelectric cell 18, which is passed to the evaluation unit 17 by means of a line 19, is used to control the light flux emitted by the light source 1. If the light is generated in a light emitting diode (LED), control is easily implemented by way of the current strength which is supplied to the LED by way of a supply line 20.

The surface portions of the markings 11 which can be recognised by the pair of photodetectors 5, 6 must involve a predetermined minimum surface area so that the photodetectors 5, 6 produce a sufficiently large electrical output signal S1 and S2 respectively. The output signal AS of the photoelectric cell 18 can advantageously be used for standardisation of the output signals S1 and S2 of the photodetectors 5 and 6, that is to say the ratios S1/AS and S2/AS are formed. Those signals S1/AS, S2/AS are independent of the effective strength of the light flux in the beam 10, but they are dependent on the total of all surface portions with the same markings 11 and the general state of the security element 4.

Figure 2:
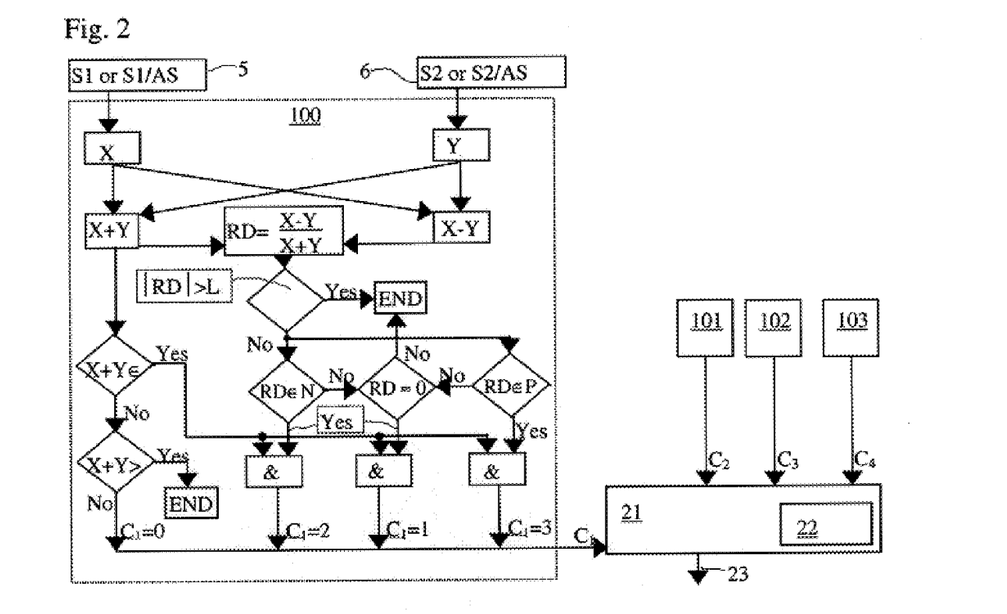
FIG. 2 shows an evaluation chart.

FIG. 2 shows the processing of the output signals X=S1 and X=S1/AS and Y=S2, Y=S2/AS respectively with reference to the diffraction plane 100 for a pair of photodetectors. The evaluation unit 17 (FIG. 1) checks whether the sum of the two output signals, X+Y, and the relative difference, RD=(X−Y):(X+Y), are in associated permitted ranges S, N and P. If the sum signal assumes values out of the permitted range S, the first marking 11 (FIG. 1) is of a predetermined minimum total area and has symmetrical or asymmetrical relief structures with the grating parameters which are predetermined for the photodetectors 5, 6 of the diffraction plane 100. If the relative difference RD is negative and if it is in the permitted range N, then the relief structure is asymmetrical, in which case the right-hand photodetector 6 is illuminated more strongly than the left-hand photodetector 5. If the relative difference RD has positive values and if they are in the permitted range P, then the relief structure is also asymmetrical but it has an azimuth which is greater by 180°, $\phi'=\phi+180°$. In this case, the level of light intensity at the left-hand photodetector 5 is greater than that at the right-hand photodetector 6. If in contrast the relative difference RD is between the values of the ranges N and P, that is to say it is practically virtually equal to zero, and if the sum signal X+Y is out of the permitted range S, the two photodetectors 5 and 6 are irradiated with almost equal strength, as is the case upon diffraction of light at a symmetrical relief structure.

If in contrast the sum signal X+Y does not reach the lower limit value U of the permitted range S, the two photodetectors 5 and 6 receive only low levels of light intensity. The light-diffracting relief structures with the grating parameters which are predetermined for the photodetectors 5, 6 of the diffraction plane 100 do not reach the predetermined minimum total area. Instead of that relief structure, it is also possible for example to use a matt structure, a flat mirror surface whose perpendicular is oriented in parallel relationship with the beam 10, a relief structure with other grating parameters, an ink applied by a printing procedure and so forth or a transparent window in the reflection layer of the laminate, as an optical marking 11 within the security element 4 (FIG. 1). This result "no predetermined relief structure" is also subjected to further processing in the evaluation unit 17.

If in contrast the sum signal X+Y exceeds the lower limit value U and the sum signal X+Y is nonetheless outside the permitted range S or the magnitude of the relative difference RD is greater than an upper limit value L, the evaluation unit 17 ignores the signals X, Y and blocks further evaluation as one or both of the photodetectors 5 and 6 receive excessively high levels of light intensity, as can occur in the event of dazzle due to suitably inclined mirror surfaces. If the value of RD is excessively far away from the value zero and does not originate from the ranges N and P, further evaluation is also blocked.

The number of optical markings 11 which can be identified with a single diffraction plane 100 and a single pair of photodetectors is therefore four; a symmetrical relief structure, two asymmetrical relief structures and none of the predetermined relief structures. The result of processing of the output signals X and Y for the diffraction plane 100 is encoded in a numeral $C_1$, for example $C_1=0$ for none of the predetermined relief structures, $C_1=1$ for a symmetrical relief structure and $C_1=2$ and $C_1=3$ respectively for one of the two asymmetrical relief structures.

The diffraction plane 100 can have a second pair of photodetectors in the points 13 (FIG. 1) and 14 (FIG. 1) and can distinguish independently of the other pairs of photodetectors between four profile types of the optical markings 11. The predetermined relief structures for the two pairs of photodetectors differ only in terms of diffraction angle.

A combination of a plurality of diffraction planes 100, 101, 102, 103 etc which are to be described in identical terms to the diffraction plane 100 simultaneously permits optical markings 11 with Q different grating parameters to be detected. The combination together has Q pairs of photodetectors. Those diffraction planes 100, 101, 102, 103 etc intersect on the optical axis 7 and include intersection angles of between 10° and 90°, that is to say the optical markings 11 which can be perceived simultaneously differ at least in respect of the azimuth $\phi$. The signals thereof are simultaneously detected and evaluated. They afford an effective basis for simultaneously machine-readable information based on the numerals $C_1, C_2, C_3, C_4$ and so forth. A data processing unit 21 evaluates the result of identification of the optical markings 11, which is implemented simultaneously for each of the Q pairs of photodetectors, with the numeral $C_q$ associated with a pair q of photodetectors, and thus produces a characteristic number:

$$Z=C_Q\cdot 4^{Q-1}+\ldots+C_q\cdot 4^{q-1}+\ldots+C_3\cdot 4^2+C_2\cdot 4^1+C_1\cdot 4^0.=\Sigma C_q\cdot 4^{q-1} \text{for } q=1 \text{ to } Q$$

Values KS of the characteristic numbers Z, being values which are permissible for a specific use, are stored as reference values in a memory 22 of the data processing unit 21, like moreover the values for the permissible ranges S, P and N and the limit values U and L. If the characteristic number Z is contained in the mass of values KS, the characteristic number Z is a permissible item of information known to the data processing unit 21, or encoding of the security element 4 (FIG. 1). With Q=4 accordingly it is possible to distinguish 256 combinations or security elements 5. The data processing unit 21 transmits in suitable form the result of that identification, such as for example recognition or non-recognition of the encoding of the security element 4, by way of an electrical path 23, for example to a visual display, to a sorting or counting machine, and so forth.

The asymmetrical diffraction structures have given relative differences RD, in accordance with the shape of their profile, for example with a first profile the value of the relative difference RD can be in the first range 0.3<RD<0.6 while with a second profile it can be in the second range 0.7<RD<0.8, in which respect the limits here serve only as an example in order to show that the two ranges do not mutually overlap. In this case the value RD can come from the quantity $N_1$ or $N_2$, $P_1$ or $P_2$ respectively. These asymmetrical relief structures differ not only in terms of the sign of the value RD but also in terms of absolute amount |RD|. The extent of the values for the numeral C therefore depends on the number M of asymmetrical relief structures which can be certainly distinguished with the absolute amount |RD|, wherein $C\in\{0, 1, \ldots, (2\cdot M+1)\}$. In the foregoing example with M=2 it is therefore possible to distinguish 6 possible structures. If K structures can be distinguished and if the assembly has Q pairs of photodetectors, the characteristic number is calculated from the sum:

$$Z = \Sigma C_q \cdot K^{q-1}, \text{ summed over all values } q=1 \text{ to } Q.$$

Figure 3:
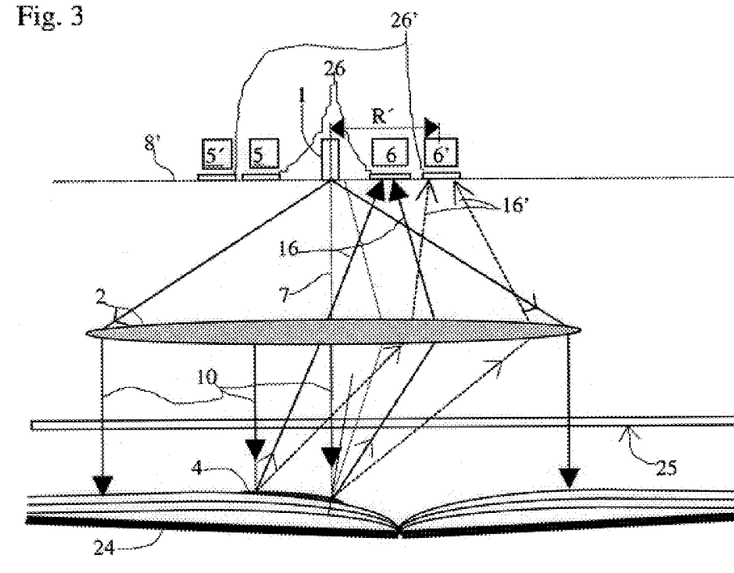
FIG. 3 shows a document with a security feature.

If in FIG. 3 the light source 1 emits its emitted radiation with a periodically fluctuating wavelength λ, as is described in above-mentioned Swiss patent specification No 653 162, the value of the diffraction angle α (FIG. 1) alters accordingly. If for example the radiation changes from green (λ≈535 nm) to red (λ≈656 nm), then the value of the diffraction angle α increases and the diffracted light 16', instead of impinging on the photodetector 6 like the light 16, is received at the location of a second photodetector 6' which is further away from the optical axis 7 than the photodetector 6, that is to say a spacing R' is greater than the spacing R (FIG. 1). The drawing of FIG. 3, for the sake of clarity, does not show the diffraction which is symmetrical with respect to the optical axis 7. The same applies for the photodetectors 5;5' and the light 15 which is deflected at the diffraction angle −α (FIG. 1). The evaluation unit 17 (FIG. 1) firstly determines the characteristic number $Z_1$ of the security element 4 with illumination with light of a wavelength $λ_1$ and then the characteristic number $Z_2$ with light of a wavelength $λ_2$. For positive identification of the security element 4, in two successive measurement procedures the respective characteristic number Z must originate from the array of values KS, which is associated for the light used, with the wavelength $λ_1$, $λ_2$.

The document 3 (FIG. 1) is shown in the form of a book 24 in the opened condition, for example this is a pass book 24 with a security element 4 stuck onto one of its pages. As a consequence of the binding, the pages of the pass book 24 are of a curvature which increases towards the binding, with the security element 4 following the curvature, because of the small thickness of the security element 4. As a result of the locally varying curvature of the surface of the security element 4, the rays of the beam 10 are incident on the markings 11 (FIG. 1), at an angle which deviates from the perpendicular. The drawing in FIG. 3 shows the light paths for two identical markings 11 whose diffracted beams are no longer parallel but divergent, because of the differing angle of incidence. The diffracted light 15 and 16 and 16' respectively therefore no longer combine at a single point 13 (FIG. 1) but impinge on the focal surface 8' at different spacings r (FIG. 1) relative to the optical axis 7. Similar conditions occur in the case of creased or crumpled paper supports, for example in the case of used bank notes, value-bearing papers such as securities or bonds, and so forth. In such a case also, the security element 4 locally follows the surface of the paper, it is only that locally the diffracted light 16, 16' is deflected out of the corresponding diffraction plane 100. In order reliably to detect the light 15 or 16 or 16' respectively which is diffracted at markings 11 which are tilted in that way, the active surface 12 (FIG. 1), 12' (FIG. 1) of the photodetectors 5; 5'; 6; 6' advantageously is of a predetermined extent both in the radial and in the azimuthal direction. A predetermined azimuthal extent in particular also permits reading-out of the markings 11 if the security element 4 or the substrate 3, 24 is poorly oriented in respect of azimuth with the diffraction planes 100, 101, 102, 103 etc. As the active surfaces 12, 12' of the photodetectors 5, 6, 6' are predetermined and are not variable in terms of size and shape, optical means 26, 26' (prisms, lenses, filters, holograms, diffraction gratings and so forth) which are arranged in front of the active surfaces 12, 12' of the photodetectors 5, 5', 6, 6' can advantageously collect the light 15, 16, 16' which is diffracted into a predetermined solid angle, and guide it onto the active surface 12, 12'. Those predetermined solid angles define on the focal plane 8' acceptance surfaces of the photodetectors 5, 6, 6'. Size and shape (portion of a circular ring, circle, sector, rectangle and so forth) are to be adapted to the purpose of use involved. For the sake of simplicity, the drawing of FIG. 4 shows those acceptance surfaces in the form of circles A to D, A' to D' and a to d, a' to d'.

A flat transparent plate, for example a glass plate, with plane-parallel surfaces, establishes in FIG. 3 a reading plane 25 with the surface remote from the convergent element 2. The glass plate permits substantially flat support for the document 3 to be tested and advantageous smoothing of the security element 4, which affords better focusing of the diffracted light in the acceptance surfaces. The glass plate also protects the internal space of the apparatus with the optical components from dust, fingerprints and so forth. This is particularly important if the apparatus is arranged upside down and the light source 1 illuminates from below the security element 4 which lies on the glass plate and is smoothed in that way. It is once again to be noted here that the optical axis 7 does not have to be perpendicular to the reading plane 25.

Figure 4:
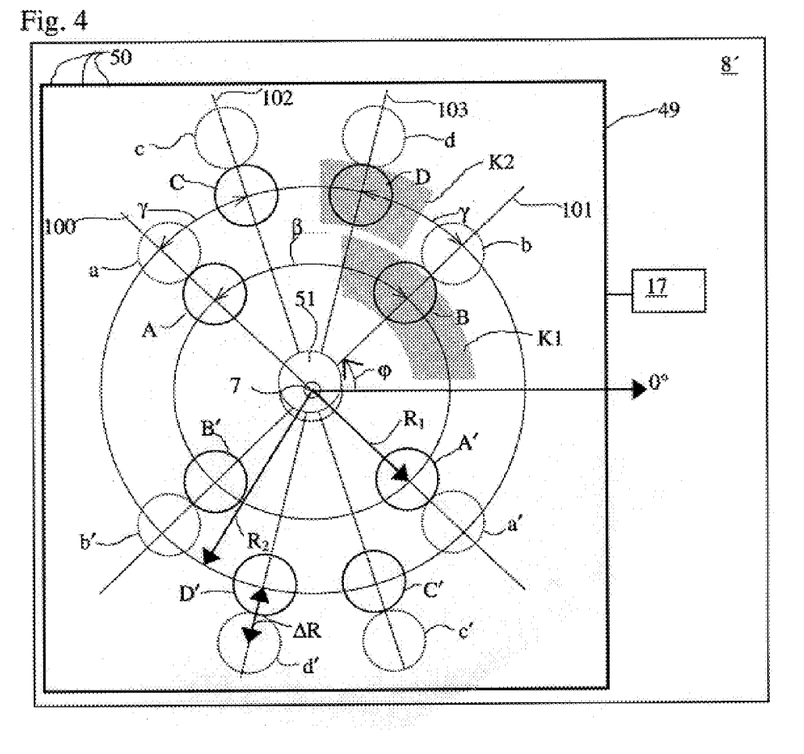
FIG. 4 shows a light pattern in a focal plane.

FIG. 4 shows the focal plane 8' of an embodiment of the apparatus with four diffraction planes 100, 101, 102 and 103 which intersect on the optical axis 7. In the drawing in FIG. 4 the optical axis 7 is perpendicular to the plane of the drawing, the immaterial diffraction planes 100, 101, 102 and 103 are illustrated by their intersection line with the focal plane 8' and the acceptance surfaces A, A', B, B', C, C', D, D' of the pairs of photodetectors are shown as circular surfaces. Those circular surfaces represent the areas in which the diffracted light 15 (FIG. 1), 16 (FIG. 2) is to be expected from the markings 11 (FIG. 1) of the security element 4 (FIG. 1), which have an optical-diffraction effect and which are oriented in the corresponding directions of the azimuth φ and φ+180° respectively, if the security element 4 passes into the beam 10 and the radial spacings $R_1$ and $R_2$ are of the values which are predetermined by the spatial frequency or diffraction angle and the wavelength λ of the beam 10.

Table 1 shows by way of example a set of parameters of an arrangement as shown in FIG. 4 for reading out with red light (λ=670 nm). The photodetectors are identified with their acceptance surfaces A, A', B, B', C, C', D and D'. Between the diffraction planes 100 and 101 whose pairs of photodetectors A-A', B-B' involve the same spacing $R_1$=9.9 mm, the intersection angle β=90° while between the next diffraction planes 100 and 102, 103 and 101 respectively, with the spacings $R_1$=9.9 mm for the pair of photodetectors A, A' and B, B' respectively and $R_2$=16.6 mm for the photodetectors C, C' and D, D' respectively the respective intersection angle γ=30°. That therefore involves an intermediate angle in regard to the diffraction planes 102 and 103 of α−2γ=30°. An achromatic lens No 322284 from Spindler & Hoyer with a nominal focal length of 25 mm is arranged as the convergent element 2 (FIG. 3). Because of the relatively small aperture of the achromatic lens the spacing between the reading plane 25 (FIG. 3) and the convergent element 2 (FIG. 3) is about 3 mm.

TABLE 1

| Diffraction plane (reference number) | Photodetector | Spacing R (mm) | Spatial frequency (lines/mm) | Azimuth φ [°] |
|---|---|---|---|---|
| 100 | A | $R_1 = 9.9$ | 638 | 135 |
|  | A' | $R_1 = 9.9$ | 638 | 315 |
| 101 | B | $R_1 = 9.9$ | 638 | 45 |
|  | B' | $R_1 = 9.9$ | 638 | 225 |
| 102 | C | $R_2 = 16.6$ | 986 | 105 |
|  | C' | $R_2 = 16.6$ | 986 | 285 |
| 103 | D | $R_2 = 16.6$ | 986 | 75 |
|  | D' | $R_2 = 16.6$ | 986 | 255 |

Figure 5:
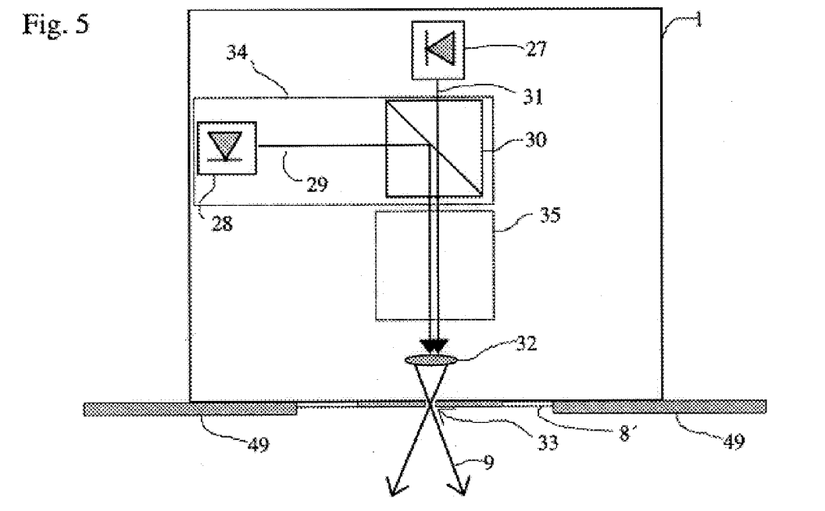
FIG. 5 shows a light source.

In an embodiment, in FIG. 5 the light source 1, besides a beam source 27 for light of a wavelength $\lambda_1$, additionally has a laser diode 28 which produces a parallel light beam 29 of a greater wavelength $\lambda_2$. A beam coupler 30 (for example a double prism, a semitransparent mirror and so forth) deflects the light beam 29 parallel to the radiation 31 from the beam source 27. The light beam 29 and the radiation 31 are focused by a lens 32, the focus as the exit pupil 33 being disposed in the focal plane 8' and forming the tip of the beam cone 9. For example, the optical markings 11 (FIG. 1) are illuminated by the light source 1 in successive measurement operations alternately with one of the two wavelengths $\lambda_1$, or $\lambda_2$ (monochromatically) or simultaneously with both wavelengths $\lambda_1$, and $\lambda_2$ polychromatically. If the wavelength $\lambda$ of the illumination of the markings 11 changes from $\lambda_1$, to the greater wavelength $\lambda_2$, the magnitude of the diffraction angle is greater and the diffracted light 16 (FIG. 3) is displaced in FIG. 4 by ΔR from the acceptance surfaces of the pairs of photodetectors A-A', B-B', C-C' and D-D' as diffracted light 16' (FIG. 3) to the acceptance surfaces, bordered with dotted lines, of the pairs of photodetectors a-a', b-b', c-c' and d-d'. The characteristic numbers $Z_1$ and $Z_2$ are ascertained from the output signals X and Y of each of the eight pairs of photodetectors (Q=8), wherein the characteristic number $Z_1$ is calculated upon illumination with the wavelength $\lambda_1$ and the characteristic number $Z_2$ is calculated with the wavelength $\lambda_2$. In the case of polychromatic illumination of the security element 4 (FIG. 3), diffracted light can be expected in the acceptance surfaces of both pairs of photodetectors, for example A-A', a-a', and so forth, in respect of the same diffraction plane 100, 101, 102 and 103 respectively. In this case only a single characteristic number Z with Q=8 is ascertained. Under some circumstances, it may be advantageous for the optical means 26 (FIG. 3), 26' (FIG. 3) to be provided with a band pass filter for the wavelengths $\lambda_1$ and $\lambda_2$ respectively. The range for the values of the wavelengths $\lambda_1$ and $\lambda_2$ is the visible and the infrared spectrum of electromagnetic waves. The laser diodes 28 produce for example a monochromatic light of a wavelength $\lambda$ which depending on the type of the laser diode 28 is in the range from $\lambda$=430 nm (blue) into the infrared with $\lambda \geq 1070$ nm. Infrared light passes for example through a cover layer which is coloured black on the laminate so that the embossed relief structures of the visually invisible optical markings 11 are to be optically scanned and the information is to be read out.

Swiss application 2172/96 (WO 98/10324) describes diffraction gratings which have an asymmetry which is dependent on the plane of polarisation of the incident light and which is particularly pronounced when the spacing d of the lines in the diffraction grating is less than three times the wavelength $\lambda$ emitted by the light source 1 (FIG. 5). Such diffraction gratings are advantageously used for the optical markings 11 which must satisfy particularly high demands in regard to anti-forgery. The optical markings 11 have as an additional security feature a pronounced dependency of the intensity of the diffracted light on the polarisation of the light. The optical markings 11 can be checked with the same pairs of photodetectors A-A', B-B', C-C' and D-D' for the presence of the additional security feature if the optical means 26, 26' which in FIG. 3 are arranged in front of the active surfaces 12, 12' of the photodetectors 5, 5', 6, 6' include suitably oriented polarisation filters.

The apparatus with the suitably oriented polarisation filters which are arranged in front of at least one of the pairs of photodetectors A-A', B-B', C-C' and D-D' have the advantage that they can recognise as a forgery copies of the security feature, based on volume holograms (H. J. Caulfield: "*Handbook of Optical Holography*", pages 202ff, Academic Press, Inc., 1979, ISBN 0-12-165350-1), on the basis of their polarisation characteristics. The orientation of the polarisation filters and the choice of the pair of photodetectors equipped with the polarisation filters depends on the parameters of the polarising diffraction grating used in the optical markings 11.

For example the polarisation filters in front of the photodetectors 5, 5' can be arranged turned through 90° relative to the polarisation filters in front of the photodetectors 6, 6'.

Another embodiment of the light source 1 is of the diagrammatic structure shown in FIG. 5 and is designed to illuminate the optical markings 11 with linearly polarised light. A polarised source 34 or 35 respectively includes the laser diode 24 and the beam coupler 30. The beam source 27 is designed to emit the radiation 31 which is linearly polarised in the plane of the drawing in FIG. 5 while the light in the beam 29 after deflection in the beam splitter 30 is oriented parallel to the radiation 31 and is linearly polarised in orthogonal relationship with the radiation 31. The direction of the plane of polarisation in the beam 10 (FIG. 1) is based on the origin of the light. In a first measurement operation the polarisation plane in the beam 10 is the same as in the radiation 31 as the beam source 27 is switched on. In the following measurement operation the light beam 29 contributes solely to illumination of the optical markings 11 so that in the beam 10 the polarisation plane of the light is turned through 90° relative to the polarisation plane of the first measurement procedure. The respective characteristic number Z for the corresponding polarisation direction is determined from two successive measurement operations. Positive identification of the security element 4 requires the number Z to originate from the array of values KS which are predetermined for the corresponding polarisation direction. As the same wavelength $\lambda$ is used in both cases, no additional pairs of photodetectors are required for recognising the influence of polarisation.

Instead of the beam source 27 the light source 1 may include a second linearly polarised source 35 which is displaced through 90°. The two beam couplers 30 orient the two light beams 29 of the sources 34, 35 in parallel relationship with the optical axis of the lens 32.

Instead of switching the radiation sources 27, 28 on and off accordingly, a mechanical or electromagnetic photoshutter can block the unwanted light in each beam path upstream of the beam coupler 30. More complicated and expensive configurations of the light source 1 (FIG. 1) can change the quality of light both in terms of the wavelength $\lambda$ and also in respect of polarisation and the direction thereof.

The number of diffraction planes 100, 101, 102, 103 and so forth provided with pairs of photodetectors and the configuration of the light source 1 depend on the extent of the security features 4 to be distinguished (FIG. 1).

Figure 6:
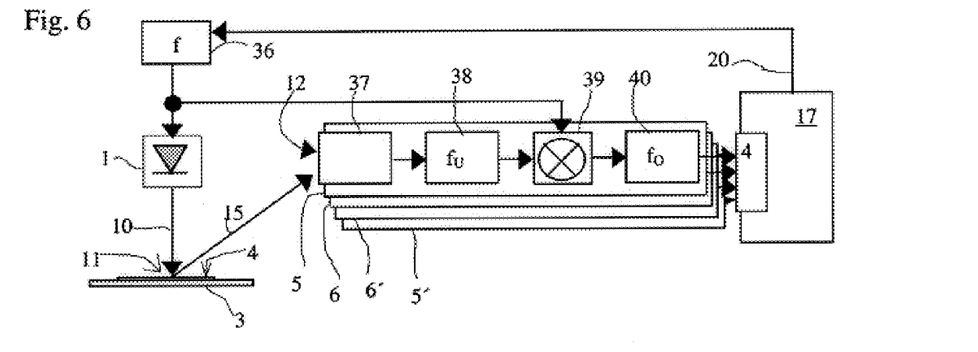
FIG. 6 shows a device for suppressing extraneous light.

Like all apparatuses for the recognition of optical markings 11, the apparatuses described herein are also susceptible to extraneous light. FIG. 6 shows an advantageous apparatus for the suppression of extraneous light, which does not involve the use of impeding screening means. The light source 1 is provided with a modulator 36 which modulates with a digital or analog modulation signal the light intensity in the beam 10 with the frequency f. The light 15, 16 (FIG. 3), 16' (FIG. 3) which is diffracted at the optical markings 11 is also modulated with the frequency f and received by the photodetector 5, 5', 6 or 6' respectively on the active surface 12, 12' (FIG. 3) of its opto-electronic transducer 37 together with natural or artificial stray light, and converted into an electrical signal. Each photodetector 5, 5', 6, 6' and so forth further includes a high pass filter 38 connected to the output of the transducer 37, a demodulator 39 connected to the modulator 36 for receiving the modulation signal, and a low pass filter 40. The electrical signal of the transducer 37 firstly passes through the high pass filter 38 with a lower limit frequency $f_u$, with the component originating from the stray light being filtered out. The remaining signal after the high pass filter 38 passes into the demodulator 39 which removes the modulation signal. The low pass filter 40 at the output of the demodulator 39 has an upper limit frequency $f_o$ and smooths the useful signal which is produced by the diffracted light 15, 16, 16' and which is output as an output signal S1 and S2 respectively of the photodetector 5, 5', 6, 6' respectively. In an embodiment by way of example, with a frequency f=18.4 kHz, the lower limit frequency $f_u$ was selected to be 2.7 kHz while the upper limit frequency $f_o$ was selected to be 1.0 kHz.

Irrespective of whether the light source 1 is or is not modulated, the radiation of the light source 1 can be switched on and off, for example cyclically. The evaluation unit 17 transits corresponding signals by way of the supply line 20 to the modulator 36 for controlling the light flux from the light source 1, a measurement cycle including at least a measurement phase and a rest phase. The switch-on period of the measurement phase can be very short as in the case of a flashlight so that the security feature 4 on the documents 3 such as bank notes or credit documents which are rapidly transported in the reading plane 25 (FIG. 3) can be virtually statically read off and identified. The switch-on period of a measurement cycle can be triggered for example by a document 3 by means of a light barrier assembly.

The beam 10 produces a diffuse scatter light at the rough surface of the paper of the document 3, 24 (FIG. 3). This component of the stray light involves a level of intensity of the order of magnitude of some percent of the intensity of the useful signal and cannot be removed by the above-described arrangement. Prior to processing as shown in FIG. 2 the evaluation unit 17 therefore advantageously investigates the output signal S1 and S2 respectively supplied by the photodetector 5, 6 and 6' to ascertain whether it exceeds a limit value G. That limit value G corresponds to the signal level which is produced by the stray light from a paper surface illuminated with the beam 11. The output signals S1, S2 generated only by the stray light are below the limit value G and are suppressed by discriminators 41 at the input of the evaluation unit 17 and are not subjected to further processing.

Figure 7:
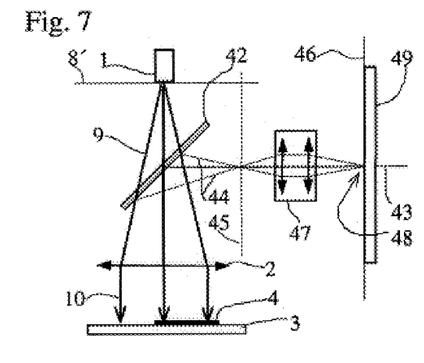
FIG. 7 shows the reading device with another arrangement of photodetectors.

In FIG. 7 a semitransparent mirror 42 is arranged in the beam cone 9 in such a way that the optical axis 7 (FIG. 1) of the convergent element 2 (illustrated by the double-headed arrow) is diverted through for example 90° and forms a second optical axis 43. The light 44, 15 (FIG. 1), 16 (FIG. 1) which is diffracted into the diffraction orders 0 and ±1 now no longer impinges in a focused condition onto the focal plane 8' but forms the image of the light pattern as a primary image of the security element 4 on a focal plane 45 with the second optical axis 43 as a perpendicular. If the photodetector plane 46 has to be arranged further from the optical axis 7, an imaging system 47 is to be interposed between the focal plane 45 and the photodetector plane 46 on the second optical axis 43. The two focal points of the imaging system 47 are in the two planes 45 and 46. With a substantially perpendicular incidence of radiation the light source 1 illuminates the document 3 and the security element 4 with the beam 10. The light diffracted into the zero diffraction order and the light 44 reflected by the document 3 passes through the focal plane 45 at a point combined on the second optical axis 43 and the image thereof is formed by means of the imaging system 47 on the photodetector plane 46 again at the point of passage 48 of the second optical axis 43. The light 15, 16 which is diffracted into the first diffraction orders is passed relative to the passage point 48 with the corresponding polar co-ordinates r, φ and r, φ+180° onto the photodetector plane 46. If the document 3 is turned through the angle v with the axis of rotation parallel to the beam 10, the light pattern on the photodetector plane 46 also turns about the point 48, that is to say all polar co-ordinates become r, φ+v and r, φ+180°+v.

Instead of the discrete photodetectors 5, 5', 6, 6' it is advantageously possible to use in the photodetector plane 46 a photodetector array or a Charge Coupled Device which are known for example from Camcorders. The photodetector arrays are faster to be read out by the evaluation unit 17 than the Charge Coupled Devices. The concept of the invention is independent of the nature of the type of detector; both are referred to hereinafter as CCD 49. Instead of a single CCD 49, in FIG. 5 two or more CCDs 49 can be arranged around the exit pupil 33 or around the optical axis 7 (FIG. 1).

Reference will now be made to FIG. 4 to describe advantageous uses of the CCDs 49 for the reading device. The CCD 49 comprises a photodetector square with over 500000 detector cells 50 with the light-sensitive transducers 37 (FIG. 6) on less than 1 cm². In the example of Table 1 the spatial frequency of 638 lines/mm is associated with the spacing $R_1$ and the spatial frequency of 986 lines/mm determines the spacing $R_2$. So that the light coming from the optical markings 11 can be reliably recognised in spite of possible creasing or crumpling of the security element 4, a safety spacing of for example ±50 lines/mm is to be provided in relation to the spatial frequencies used for the other diffraction elements of the security element 4 (FIG. 1). The spatial frequencies used in relation to the markings 11 (FIG. 3) are not used in the other diffraction elements of the security element 4 so that the light received by the detector cells 50 in two circular rings K1, K2 (illustrated in the form of two shaded portions of a circular ring) with the mean radii $R_1$ and $R_2$ clearly originates from the markings 11.

The light pattern is formed in the drawing in FIG. 4 for example from the illuminated circular surfaces A to D or A' to D' respectively in the two circular rings K1, K2 and a spot 51 at the passage point 48. If the azimuth of the security element 4 is changed, the circles A to D or A' to D' move in a predetermined manner in the form of a fixed pattern on the two circular rings K1, K2 about the point 48. When the security element 4 is tilted the spot 51 moves and the light pattern is distorted. By means of mathematical re-transformation the light pattern can have its distortion removed and it can be compared or correlated to the permitted reference patterns. The evaluation unit 17 connected to the CCD 49 firstly determines the precise polar co-ordinates r, φ and r, φ+180° of the detector cells 50 which are illuminated in the circles A to D or A' to D', produces an image of the light pattern in the memory 22 (FIG. 2) and compares that image to predetermined reference patterns stored in the memory 22. The reference patterns include at least three pairs of points of concentration of intensity of the diffracted light which is to be expected on both sides of the optical axis 7, 43 within the two circular rings K1, K2. All signals from the detectors 50 which do not lie on the two circular rings K1, K2 do not originate from the markings 11 and are suppressed. Because of the high resolution capability of the CCDs 49 the output signal X and Y respectively of one of the illuminated circles A to D or A' to D' respectively is formed from the signals of many adjacent detector cells 50 and the co-ordinates of each signal are calculated from the point of concentration of the intensity of illumination. The output signal X with the circle co-ordinates (r, φ) and the output signal Y with the circle co-ordinates (r, φ+180°) form a pair of signals X, Y, the signals thereof having been produced by the diffracted light of an optical marking 11 involving predetermined grating parameters. According to the number of optical markings 11 with different grating parameters, there are such pairs of signals X, Y which are analysed in accordance with the procedure shown in FIG. 2. Each pair of signals X, Y corresponds to the two output signals S1, S2 of the pair of photodetectors 5, 6 and 5', 6' respectively and can be correspondingly designated, for example A-A'. Stored in the memory 22 are further reference values which are required to obtain the group of all output signals S1 and S2, for example the radii R1 and R2, the widths of the circular rings K1, K2, the reference patterns to be recognised, and so forth. For successfully reading out the markings 11, they must only be in the beam 10; the azimuthal orientation, the spacing from the reading plane 25 (FIG. 3) and lateral displacement of the document 3 (FIG. 7) have no influence while substantial tilting of document 3 can be corrected.

Figure 8:
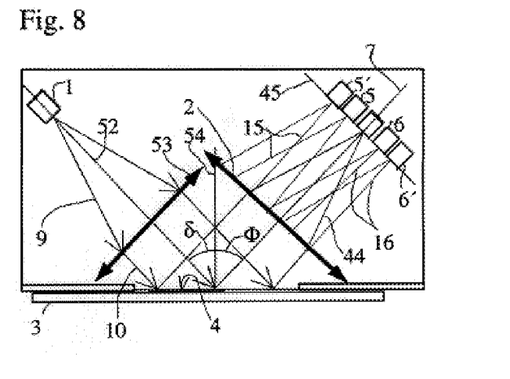
FIG. 8 shows the reading device with inclined illumination.

FIG. 8 shows a reading device with an illumination axis 52 which is inclined with respect to the perpendicular 54 onto the reading plane 25 (FIG. 3) through an angle δ (preferably 0°≦δ≦45°). The advantage of this arrangement lies in the compact structure involved. The light from the light source 1 is fanned out to form the beam cone 9 and converted into the parallel beam 10 by means of an optical entry element 53 (lens, concave mirror, hologram, diffraction grating and so forth). The reflected and the diffracted light 44 and 15, 16 is transferred with the convergent element 2 to a focal plane 45 where the light is incident on the photodetectors 5, 5', 6, 6' or on a CCD 49 (FIG. 7). The optical axis 7 of the convergent element 2 includes an angle Φ with respect to the perpendicular 54, wherein for example δ=Φ and the illumination axis 52 can be in the same plane as the optical axis 7 and the perpendicular 54. In themselves the illumination axis 52 and the optical axis 7 can involve any directions in the half-space above the security element 2 insofar as they intersect in the reading plane 25 (FIG. 3). Likewise the angles δ, Φ do not need to be the same (δ≠Φ). The choice of the angles δ, Φ is substantially free but must be matched with the grating parameters of the optical markings 11 to be recognised (FIG. 6) and the wavelength λ of the light source 1. The above-described, simple diffraction conditions with the diffraction planes 100 (FIG. 1) and so forth no longer apply in the arrangement shown in FIG. 8. The directions in which the light of the beam 10 is diffracted at a predetermined grating are generally no longer in a diffraction plane but on a conical surface, that is to say the light patterns on the focal plane 45 are distorted with respect to the perpendicular incidence of light. The patterns can be calculated for the angle δ in accordance with the information relating to "Conical Diffraction" in "Electromagnetic Theory of Gratings" edited by R. Petit, Springer—Verlag, Berlin, 1980, and stored as reference patterns in the memory 22 (FIG. 2). Evaluation of the signals from the detector cells 50 of the CCD 49 is again effected by a comparison of the image of the light pattern with the reference patterns and by pair-wise association of the signals from the detectors 50 (FIG. 4) with the pairs of signals X, Y corresponding to the various optical markings 11 and further processing of all signal pairs X, Y as described above.

Only the diffraction orders 0, ±1 have been mentioned in the foregoing examples. Without departing from the concept of the invention it is also possible to involve other diffraction orders in the analysis, for example the ±2nd diffraction orders or the −1st and the −2nd diffraction orders.

What is claimed is:

1. Apparatus for simultaneous machine recognition of optical-diffraction markings (11) of a security element (4) on a substrate (3; 24) arranged in a reading plane (25) having a light source (1) for irradiating light (10) of at least a predetermined wavelength λ onto the reading plane (25), at least three pairs of photodetectors (A-A'; a-a', B-B'; b-b'; C-C'; c-c'; D-D'; d-d') each comprising two photodetectors (5; 5'; 6; 6') which are arranged symmetrically with respect to the optical axis (7) and which establish a diffraction plane (100; 101; 102; 103) and which are adapted to convert the radiation (15; 16; 16') diffracted at the markings (11) or reflected at the substrate (3; 24) respectively into electrical signals S1, S2 of the pair from the photodetectors (5; 5'; 6; 6'), and an evaluation unit (17) for evaluation of the signals S1, S2, characterised in that an exit pupil (33) of the light source (1) is in a focal surface (8') remote from the reading plane (25), of a convergent element (2 and 53) with a large aperture, which is arranged between the light source (1) and the reading plane (25) and which serves to produce a parallel ray beam (10) illuminating the reading plane (25), from a beam cone (9) issuing from the exit pupil (33), between the markings (11) and the photodetectors (5; 5'; 6; 6') is the convergent element (2) which is adapted to focus the parallel radiation (15; 16; 16') diffracted at the markings (11) and reflected at the substrate (3; 24) respectively onto the operative surface (12; 12') of the photodetectors (5; 6 and 5', 6'), which operative surface is arranged in the focal surface (8' and 45 and 46) of the convergent element (2), the photodetectors (5; 5'; 6; 6') are adapted to produce electrical signals S1 and S2 respectively proportional to the intensity of the diffracted light (15 and 16) incident on the operative surface (12 and 12'), and the evaluation unit (17) is adapted to form the output signals X, Y from each pair of the electrical signals S1, S2 and at least to calculate relative differences RD=(X−Y):(X+Y) from the output signals X, Y of each of the pairs of photodetectors (A-A'; a-a', B-B'; b-b'; C-C'; c-c'; D-D'; d-d') and to identify the security element (4) by means of the calculated relative differences RD.

2. Apparatus according to claim 1 characterised in that there are provided at least two pairs of photodetectors (A-A', B-B') at a first spacing $R_1$ symmetrically with respect to the optical axis (7 and 43) of the convergent element (2), the diffraction planes (100; 101) thereof intercepting on the optical axis (7 and 43) at an intersection angle β, and that there are provided two further pairs of photodetectors (C-C';

D-D') at a second spacing $R_2$ symmetrically with respect to the optical axis (7 and 43), the optical planes (102; 103) thereof intersecting on the optical axis (7 and 43) at an angle β−2γ, and that the four diffraction planes (100; 101; 102; 103) have a common plane which halves the angles β and β−2γ and which also contains the optical axis (7 and 43).

3. Apparatus according to claim 1 characterised in that arranged between the optical convergent element (2) and the active surface (12; 12') of each photodetector (5; 5'; 6; 6') are optical elements (26; 26') for focusing the diffracted light (15; 16; 16'; 44) onto the active surface (12; 12') and/or for selection of the light quality (colour, polarisation) intended for reception.

4. Apparatus according to claim 1 characterised in that the evaluation unit (17) further includes:
   a) a data processing unit (21) with a memory (22) for all reference values,
   b) a device for forming a sum signal X+Y from all pairs of the output signals X and Y,
   c) testing devices for comparing all sum signals X+Y to the array of the values stored in the memory (22) of a first predetermined range S and of a lower limit value U and all relative differences RD to values stored in the memory (22) of an upper limit value L and predetermined permitted ranges N and P,
   d) a unit for forming a result Z of all testing devices, which is representative of the security element (4), and
   e) a unit for recognition of the security element (4) by comparison of the representative result Z with further reference values KS from the memory (22).

5. Apparatus according to claim 1 characterised in that the evaluation unit (17) is adapted to control and monitor the intensity and the quality of the light emitted from the light source (1).

6. Apparatus according to claim 5 characterised in that the light source (1) is adapted for the emission of polychromatic light with the two mean wavelengths $\lambda_1$ and $\lambda_2$.

7. Apparatus according to claim 5 characterised in that the light source (1) is adapted for switching over between predetermined values $\lambda_1$, $\lambda_2$ of the wavelength λ of the light emitted from the light source (1).

8. Apparatus according to claim 5 characterised in that the light in the beam (10) is linearly polarised and that the light source (1) is adapted for cyclically switching over between two mutual orthogonal directions of the polarisation of the light emitted from the light source (1).

9. Apparatus according to claim 5 characterised in that the light source (1) includes a modulator (35) for controlling the intensity of the light flux from the light source (1) with the frequency f.

10. Apparatus for simultaneous machine recognition of optical-diffraction markings (11) of a security element (4) on a substrate (3; 24) arranged in a reading plane (25) having a light source (1) for irradiating light (10) of at least a predetermined wavelength λ onto the reading plane (25), photodetectors (5; 5'; 6; 6'; 50) for converting the radiation (15; 16; 16') diffracted at the markings (11) and reflected at the substrate (3; 24) respectively into electrical signals S1, S2 proportionally to the intensity of the reflected radiation (15; 16; 16'), and an evaluation unit (17) for evaluation of the signals S1, S2, characterised in that
   an exit pupil (33) of the light source (1) is disposed in a focal surface (8') remote from the reading plane (25) of a convergent element (2 and 53) with a large aperture, which is arranged between the light source (1) and the reading plane (25) and which serves to produce a parallel ray beam (10) illuminating the reading plane (25) from a beam cone (9) issuing from the exit pupil (33),
   between the markings (11) and the photodetectors (5; 5'; 6; 6'; 50) is the convergent element (2) which is adapted to focus the parallel radiation (15; 16; 16') which is diffracted at the markings (11) and reflected at the substrate (3; 24) respectively onto the operative surface (12; 12') of the photodetectors (5; 6; 5', 6'; 50), which operative surface is arranged in the focal surface (8' and 45 and 46) of the convergent element (2),
   the evaluation unit (17) is adapted to read the electrical signals S1, S2 of the photodetectors (5; 5'; 6; 6'; 50) and to recognise the light pattern which occurs upon illumination of the optical markings (11) in the focal surface (8' and 45 and 46), wherein evaluation is effected in the steps:
      a) by a comparison of a light pattern registered by the photodetectors (5; 5'; 6; 6'; 50) with reference patterns stored in the memory (22) with at least three pairs of points of concentration of intensity symmetrically with respect to the optical axis (7 and 43) of the convergent element (2),
      b) by association of the pairs of output signals X and Y of the corresponding photodetectors (5; 5'; 6; 6'; 50) with the pairs of the points of concentration of intensity in the reference pattern, wherein the output signals X and Y correspond to the signals S1, S2 in the corresponding points of concentration of intensity in the light pattern of the diffracted radiation (15; 16; 16') and wherein each pair of the output signals X and Y is produced by one of the optical markings 11 with predetermined grating parameters, and
      c) by calculation of relative differences RD=(X−Y):(X+Y) from the output signals X, Y of each of the pairs of signals (A-A'; a-a', B-B'; b-b'; C-C'; c-c'; D-D'; d-d'), and
   the evaluation unit (17) is adapted to identify the security element (4) by means of the calculated relative differences RD.

11. Apparatus according to claim 10 characterised in that the exit pupil (33) of the light source (1) is arranged at the focal point of an optical entry element (53) on an illumination axis (52), that the illumination axis (52) and the parallel ray beam (10) is inclined with respect to a perpendicular (54) to the reading plane (25) through an angle −v, that the optical axis (7 and 43) of the convergent element (2) includes an angle +Φ with the perpendicular (54), that the diffraction axis (52), the perpendicular (54) and the optical axis (7 and 43) lie in one plane, and that with the convergent element (2) focusing of the diffracted and the reflected radiation (15, 16, 16' 44) is effected onto the photodetector plane (8'; 45; 46).

12. Apparatus according to claim 10 characterised in that the photodetectors (5; 5'; 6; 6'; 50) are the detectors of at least one CCD-unit (49) which is connected to the evaluation unit (17) and which is arranged symmetrically with respect to the optical axis (7 and 43).

13. Apparatus according to claim 10 characterised in that the evaluation unit (17) further includes:
   a) a data processing unit (21) with a memory (22) for all reference values,
   b) a device for forming a sum signal X+Y from all pairs of the output signals X and Y,
   c) testing devices for comparing all sum signals X+Y to the array of the values stored in the memory (22) of a first predetermined range S and of a lower limit value U and all relative differences RD to values stored in the memory (22) of an upper limit value L and predetermined permitted ranges N and P, d) a unit for forming a result Z of all testing devices, which is representative of the security element (4), and e) a unit for recognition of the security element (4) by comparison of the representative result Z with further reference values KS from the memory (22).

14. Apparatus according to claim 10 characterised in that the evaluation unit (17) is adapted to control and monitor the intensity and the quality of the light emitted from the light source (1).

15. Apparatus according to claim 14 characterised in that the light source (1) is adapted for the emission of polychromatic light with the two mean wavelengths $\lambda_1$ and $\lambda_2$.

16. Apparatus according to claim 14 characterised in that the light source (1) is adapted for switching over between predetermined values $\lambda_1$, $\lambda_2$ of the wavelength $\lambda$ of the light emitted from the light source (1).

17. Apparatus according to claim 14 characterised in that the light in the beam (10) is linearly polarised and that the light source (1) is adapted for cyclically switching over between two mutual orthogonal directions of the polarisation of the light emitted from the light source (1).

18. Apparatus according to claim 14 characterised in that the light source (1) includes a modulator (35) for controlling the intensity of the light flux from the light source (1) with the frequency f.

* * * * *